United States Patent
Sutton et al.

(10) Patent No.: US 9,679,210 B2
(45) Date of Patent: *Jun. 13, 2017

(54) USING PASSIVE DRIVER IDENTIFICATION AND OTHER INPUT FOR PROVIDING REAL-TIME ALERTS OR ACTIONS

(71) Applicant: Lytx, Inc., San Diego, CA (US)

(72) Inventors: Greg Sutton, Del Mar, CA (US); Tom Butch, Del Mar, CA (US); Syrus C. Nemat-Nasser, San Diego, CA (US); Andrew Tombras Smith, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,731

(22) Filed: Dec. 2, 2015

(65) Prior Publication Data

US 2016/0086043 A1    Mar. 24, 2016

Related U.S. Application Data

(63) Continuation of application No. 13/914,339, filed on Jun. 10, 2013, now Pat. No. 9,235,750, which is a
(Continued)

(51) Int. Cl.
| | |
|---|---|
| *G05D 1/00* | (2006.01) |
| *G06K 9/00* | (2006.01) |
| *B60W 40/09* | (2012.01) |
| *B60R 25/25* | (2013.01) |
| *B60T 17/18* | (2006.01) |
| *B60T 7/18* | (2006.01) |
| *B60T 7/22* | (2006.01) |
| *B60R 25/01* | (2013.01) |
| *B60R 25/10* | (2013.01) |

(Continued)

(52) U.S. Cl.
CPC .......... *G06K 9/00845* (2013.01); *B60R 25/01* (2013.01); *B60R 25/10* (2013.01); *B60R 25/25* (2013.01); *B60T 7/18* (2013.01); *B60T 7/22* (2013.01); *B60T 17/18* (2013.01); *B60W 40/09* (2013.01); *G01C 21/3407* (2013.01); *G06K 9/00221* (2013.01); *G06K 9/00255* (2013.01); *G06K 9/00288* (2013.01); *B60K 28/02* (2013.01); *B60W 30/00* (2013.01); *B60W 40/08* (2013.01); *B60W 2040/0809* (2013.01)

(58) Field of Classification Search
CPC .... G06K 9/00221; B60W 40/09; B60R 25/25
USPC ...... 701/1, 29.6, 33.4, 45; 340/439; 382/104
See application file for complete search history.

(56) References Cited

U.S. PATENT DOCUMENTS 8,744,642 B2 *  6/2014  Nemat-Nasser ...... B60W 40/09
                                                                340/439
9,235,750 B1 *  1/2016  Sutton ................ G06K 9/00845
(Continued)

*Primary Examiner* — Gertrude Arthur Jeanglaud
(74) *Attorney, Agent, or Firm* — Van Pelt, Yi & James LLP

(57) ABSTRACT

A system for providing real-time alerts or actions comprises an image capturing device and a processor and a memory. The image capturing device is for capturing an image during vehicle operation and of an expected driver location. The processor is configured to: 1) detect a face of a driver in the image; 2) determine a set of face data from the image; and 3) determine authentication based at least in part on the set of face data. The memory is coupled to the processor and configured to provide the processor with instructions.

20 Claims, 8 Drawing Sheets

Related U.S. Application Data continuation-in-part of application No. 13/235,263, filed on Sep. 16, 2011, now Pat. No. 8,744,642.

(51) Int. Cl.
*G01C 21/34* (2006.01)
*B60K 28/02* (2006.01)
*B60W 30/00* (2006.01)
*B60W 40/08* (2012.01)

(56) References Cited

U.S. PATENT DOCUMENTS

| | | | |
|---|---|---|---|
| 2006/0011399 A1* | 1/2006 | Brockway | A61B 5/18 180/272 |
| 2006/0082438 A1* | 4/2006 | Bazakos | G06K 9/00255 340/5.82 |
| 2006/0204059 A1* | 9/2006 | Ido | B60R 25/04 382/118 |
| 2006/0215884 A1* | 9/2006 | Ota | B60R 25/04 382/118 |
| 2008/0157510 A1* | 7/2008 | Breed | B60N 2/002 280/735 |
| 2008/0252487 A1* | 10/2008 | McClellan | G01S 5/0027 340/936 |
| 2011/0043624 A1* | 2/2011 | Haug | G06K 9/00791 348/135 |
| 2012/0046803 A1* | 2/2012 | Inou | A61B 5/18 701/1 |
| 2012/0134547 A1* | 5/2012 | Jung | G06K 9/00832 382/118 |

* cited by examiner

| Driver Information Database ||||| 
|---|---|---|---|---|
| ID | Name | Weight | Image Data | Voice Data |
| 001 | Frank Jones | 185 | fj001.jpg | fj001.wav |
| 002 | Mark Smith | 222 | ms002.jpg | ms002.wav |
| 003 | Shiela Lee | 140 | sl003.jpg | sl003.wav |
| 004 | John Vest | 135 | jv004.jpg | jv004.wav |
| 005 | Sam Wise | 156 | sw005.jpg | sw005.wav |
| 006 | Joe Brown | 210 | jb006.jpg | jb006.wav |
| 007 | Carl Bode | 192 | cb007.jpg | cb007.wav |
| 008 | Tom Street | 173 | ts008.jpg | ts008.wav |
| 009 | Julie Waters | 110 | jw009.jpg | jw009.wav |

Fig. 3

USING PASSIVE DRIVER IDENTIFICATION AND OTHER INPUT FOR PROVIDING REAL-TIME ALERTS OR ACTIONS

CROSS REFERENCE TO OTHER APPLICATIONS

This application is a continuation of U.S. patent application Ser. No. 13/914,339 now U.S. Pat. No. 9,235,750, entitled USING PASSIVE DRIVER IDENTIFICATION AND OTHER INPUT FOR PROVIDING REAL-TIME ALERTS OR ACTIONS filed Jun. 10, 2013, which is incorporated herein by reference for all purposes, which is a continuation in part of U.S. patent application Ser. No. 13/235,263, now U.S. Pat. No. 8,744,642, entitled DRIVER IDENTIFICATION BASED ON FACE DATA filed Sep. 16, 2011, which is incorporated herein by reference for all purposes.

BACKGROUND OF THE INVENTION

Commercial vehicles (e.g., cars and trucks) can suffer many kinds of anomalous events that may reduce productivity. Prominent types of anomalous events include accidental events (e.g., breakdowns, collisions) and malicious events (e.g., theft, vandalism). Commercial vehicles often include a vehicle event recorder in order to better understand the timeline of an anomalous event, e.g., recording video during a collision; recording vehicle state data to understand the cause of a breakdown, etc. Vehicle event recorders are primarily designed to record data associated with accidental anomalous events. Use of a vehicle event recorder not only reduces potential cost related to an accidental anomalous event, it reduces insurance liability to the vehicle owner. Vehicle event recorders are not typically used to record data associated with malicious events. However, they can both reduce the liability associated with a malicious event and also potentially prevent a malicious event while it is occurring.

BRIEF DESCRIPTION OF THE DRAWINGS

Various embodiments of the invention are disclosed in the following detailed description and the accompanying drawings.

FIG. 3 is a diagram illustrating an embodiment of a driver information database.

DETAILED DESCRIPTION

Figure 1:
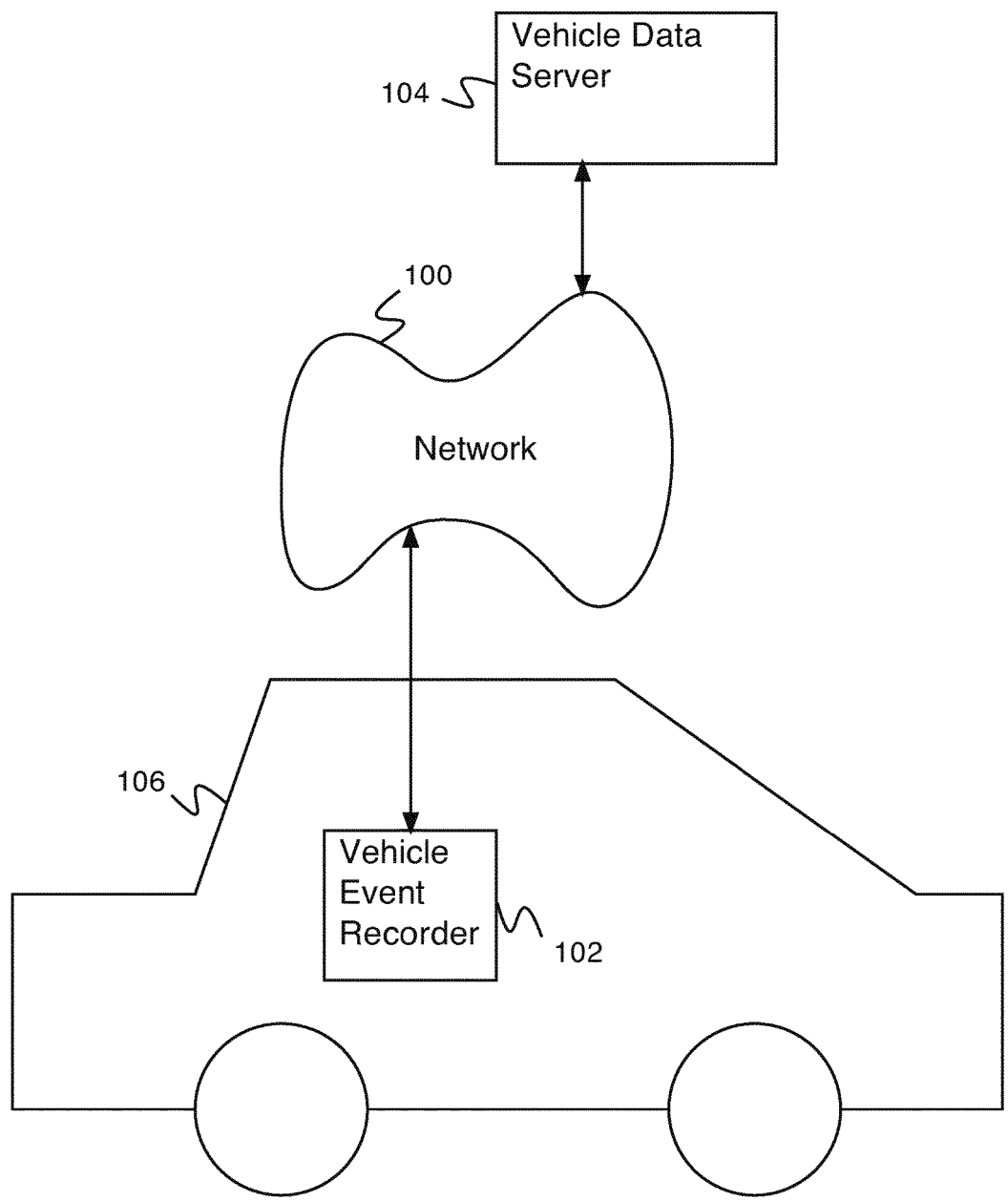
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using passive driver identification and other input for providing real-time alerts or actions is disclosed. A system for providing real-time alerts or actions comprises an image capturing device for capturing an image during vehicle operation and of an expected driver operation; a processor configured to detect a face of a driver in the image, determine a set of face data from the image, and determine authentication based at least in part on the set of face data; and a memory coupled to the processor and configured to provide the processor with instructions.

A vehicle event recorder system comprises a set of sensors (e.g., GPS, accelerometer, cameras, etc.) and an event detector designed to detect anomalous events. At periodic intervals anomalous events are uploaded to a central vehicle event recorder monitoring system. The sensors include both a road-facing camera for recording events occurring on the road and a driver-facing camera for recording information related to the driver. The driver-facing camera can additionally be used for driver identification, e.g., determining whom the driver is for the purpose of keeping a driver safety history. Drivers of a particular vehicle have distinguishing characteristics stored in a driver information database.

A vehicle event recorder system comprising a driver identification system can be additionally used for the purpose of preventing vehicle theft. When the vehicle event recorder system detects the presence of a new driver in the vehicle, it automatically identifies the driver. If it is a driver in the driver information database, the driver is registered as the current driver for the purpose of tracking the safety history of the driver. If it is not a driver in the driver information database, the driver is identified as attempting theft of the vehicle. In various embodiments, when a driver is identified as attempting theft of the vehicle, the vehicle is disabled; the vehicle sends an alert to the central vehicle event recorder monitoring system; the vehicle sends GPS tracking data to the central vehicle event recorder monitoring system; an alarm is activated; or any other appropriate action is taken.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 comprises a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine RPM (revolutions per minute) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In some embodiments, vehicle event recorder 102 comprises a system for preventing theft. In some embodiments, vehicle event recorder 102 comprises a system for using passive driver identification and other input for providing real-time alerts or actions. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station.

Figure 2:
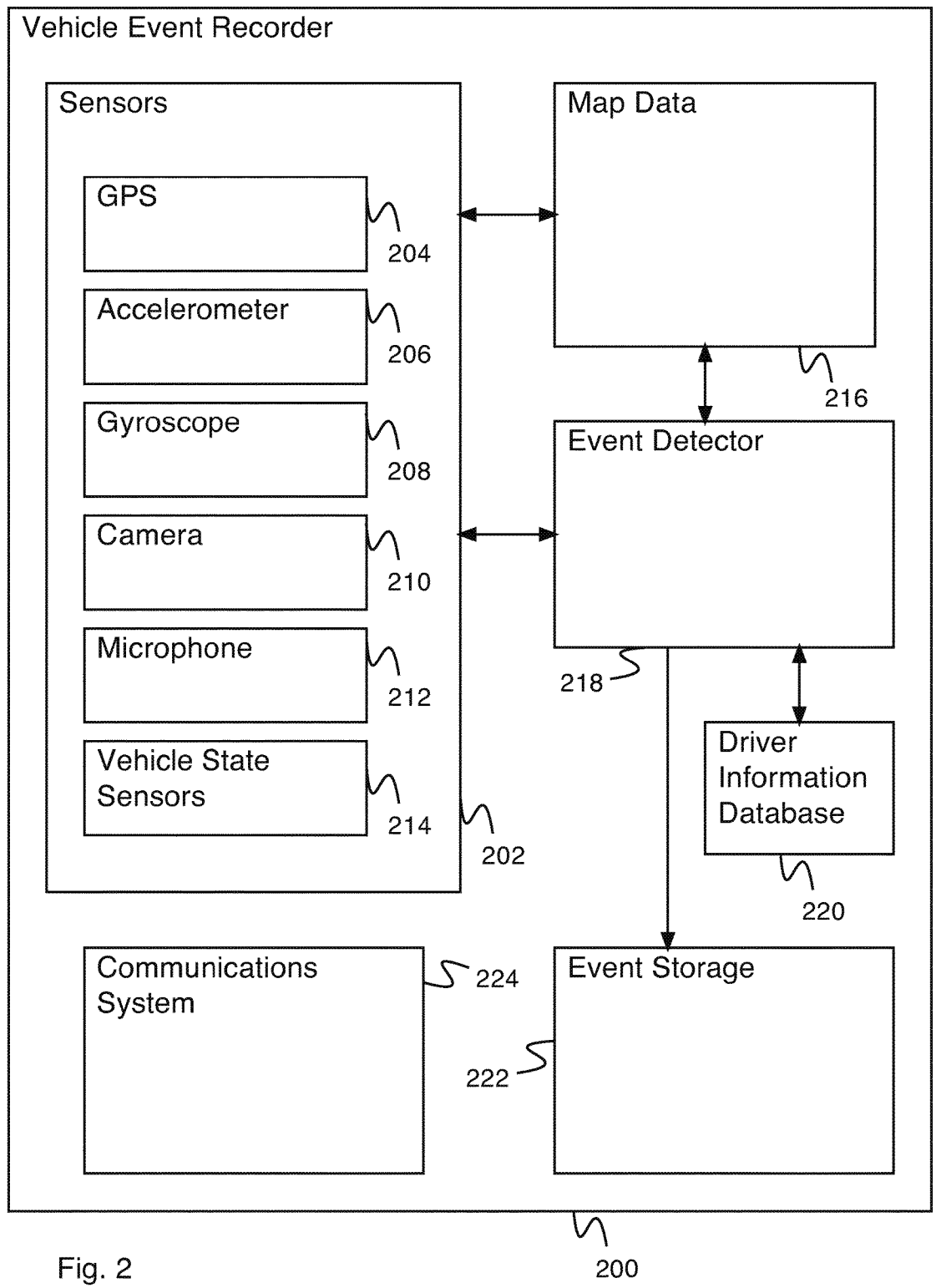
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises sensors 202. Sensors 202 comprise GPS 204, accelerometer 206, gyroscope 208, camera 210, microphone 212, and vehicle state sensors 214. In various embodiments, sensors 202 additionally comprises outdoor temperature sensors, moisture sensors, laser line tracker sensors, fingerprint sensors, magnetic stripe sensors, radio frequency identification tag sensors, or any other appropriate sensors. In some embodiments, camera 210 comprises a road-facing camera. In some embodiments, camera 210 comprises a driver-facing camera. In some embodiments, camera 210 comprises both a driver-facing camera and a road-facing camera. In some embodiments, camera 210 comprises an image capturing device for capturing an image during vehicle operation and of an expected driver location. In various embodiments, vehicle state sensors 214 comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle state sensors 214 communicate via an OBD (on-board diagnostics) bus. Sensors 202 communicate with map data 216. In some embodiments, GPS 202 communicates with map data 216. In some embodiments, GPS 204 in conjunction with map data 216 can accurately report vehicle speed.

Event detector 218 communicates with sensors 202 and map data 216. In some embodiments, event detector 218 receives sensor data from sensors 202. In some embodiments, event detector 218 detects events using sensor data from sensors 202. In some embodiments, event detector 218 detects driver identity information using sensor data from sensors 202. In some embodiments, event detector 218 communicates with driver information database 220 in order to determine if the current driver is an appropriate driver. In some embodiments, event detector 218 uses sensor data from sensors 202 in conjunction with driver information database 220 to detect unauthorized driver events. In some embodiments, event detector 218 stores event information in event storage 222. In some embodiments, vehicle event recorder 200 transmits event information to a vehicle data server (e.g., vehicle data server 104 of FIG. 1). In some embodiments, vehicle event recorder 200 transmits sensor data (e.g., GPS data, camera data, accelerometer data, etc.) to the vehicle data server. In some embodiments, driver information database 220 is stored on the vehicle data server. In some embodiments, vehicle event recorder 200 communicates with the vehicle data server using communications system 224. In some embodiments, communications system 224 communicates with a network (e.g., network 100 of FIG. 1).

FIG. 3 is a diagram illustrating an embodiment of a driver information database. In some embodiments, driver information database 300 comprises driver information database 220 of FIG. 2. In the example shown, driver information database 300 comprises ID, Name, Weight, Image Data, and Voice Data fields for each of a set of drivers. In some embodiments, weight information comprises information collected from a driver seat weight sensor (e.g., a driver seat weight sensor of vehicle state sensors 214 of FIG. 2). In some embodiments, image data comprises image data from a driver facing camera (e.g., camera 210 of FIG. 2). In some embodiments, raw image data is stored. In some embodiments, compressed image data is stored. In some embodiments, processed (e.g., cropped, color-balanced, Fourier transformed, filtered, enhanced, etc.) image data is stored. In some embodiments, derived image data (e.g., face data, facial parameters, image hash data, etc.) is stored for the image data. In some embodiments, voice data comprises voice data from a microphone (e.g., microphone 212 of FIG. 2). In some embodiments, raw voice data is stored. In some embodiments, compressed voice data is stored. In some embodiments, processed (e.g., de-noised, dynamic range compressed, filtered, Fourier transformed, etc.) voice data is stored. In some embodiments, derived voice data (e.g., vocal parameters, formants, voice hash data, etc.) is stored for the voice data.

In some embodiments, driver information database 300 additionally comprises a driver schedule. In some embodiments a driver schedule comprises a driver or list of drivers approved to drive a vehicle for each driving shift. In some embodiments, determining authentication comprises checking a driver schedule.

Figure 4:
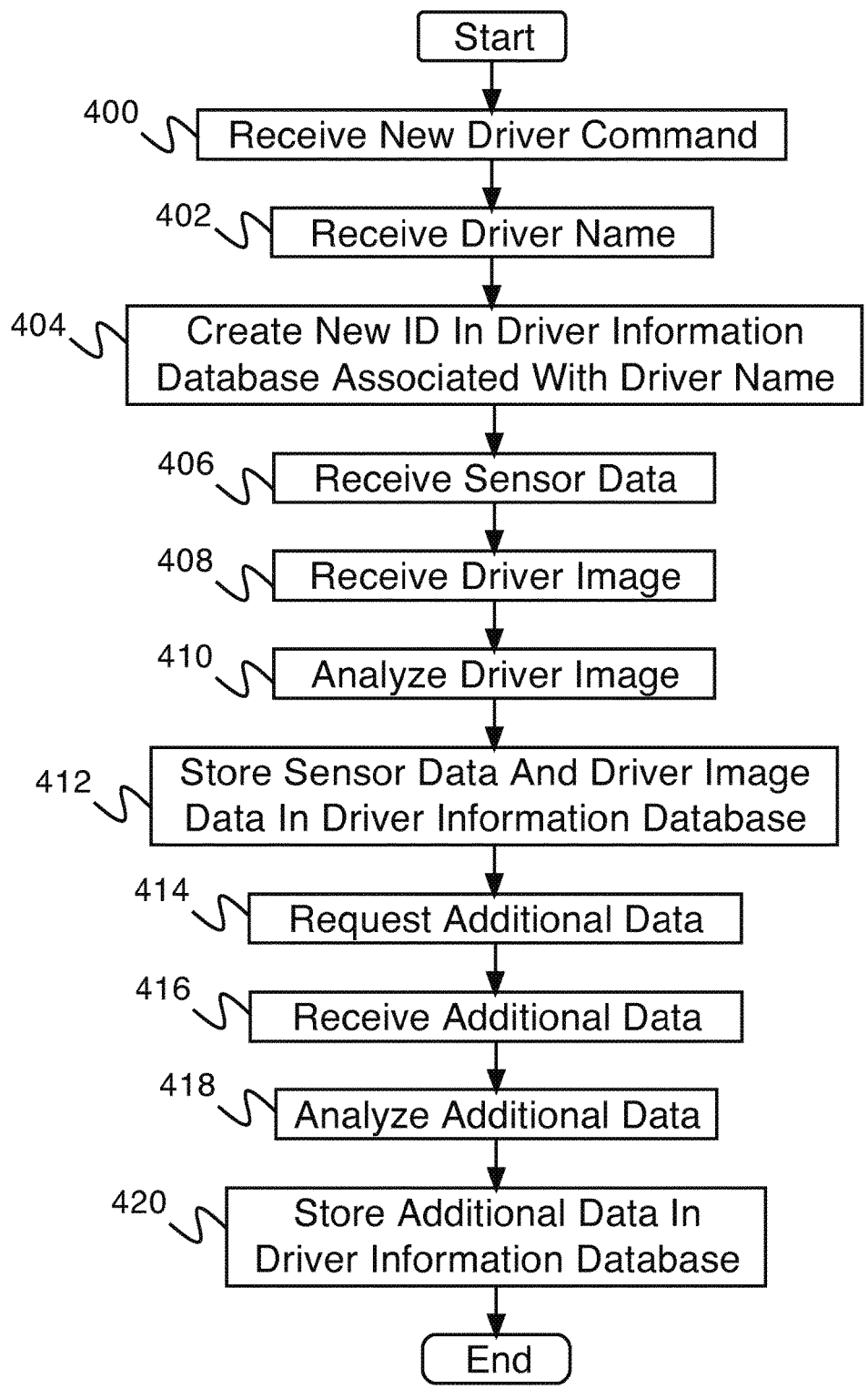
FIG. 4 is a flow diagram illustrating a process for adding a new driver to a vehicle event recorder system including using passive driver identification and other input for providing real-time alerts or actions.

FIG. 4 is a flow diagram illustrating a process for adding a new driver to a vehicle event recorder system including using passive driver identification and other input for providing real-time alerts or actions. In some embodiments, the process of FIG. 4 is used by a vehicle event recorder (e.g., vehicle event recorder 200 of FIG. 2) for adding a new driver to a driver information database (e.g., driver information database 220 of FIG. 2). In the example shown, in 400, a new driver command is received. In some embodiments, a new driver command is received from a vehicle data server (e.g., vehicle data server 104 of FIG. 1). In some embodiments, a new driver command is received directly by the vehicle event recorder. In some embodiments, a new driver command requires a password or other authentication in order to be considered valid. In 402, a driver name is received. In 404, a new ID is created in the driver information database associated with the driver name. In 406, sensor data is received. In some embodiments, sensor data comprises weight data. In some embodiments, sensor data is received from a driver's seat weight sensor (e.g., a driver's seat weight sensor of vehicle state sensors 214 of FIG. 2). In some embodiments, sensor data comprises other driver identifying sensor data (e.g., accelerometer data during vehicle entry, a camera image of an identification card, etc.). In 408, a driver image is received. In some embodiments, a driver image is received from a driver-facing camera (e.g., camera 210 of FIG. 2). In 410, the driver image is analyzed. In various embodiments, driver image analysis comprises cropping, color-balancing, Fourier transforming, image filtering, image enhancing, determining face data, facial parameter derivation, image hashing, or any other appropriate image analysis technique. In 412, sensor data and driver image data are stored in the driver information database. In some embodiments, the sensor data and driver image data are stored in the driver information database associated with the ID created in 404. In some embodiments, the raw driver image is stored. In some embodiments, a compressed driver image is stored. In some embodiments, image analysis data is stored. In some embodiments, face data is stored. In 414, additional data is requested. In some embodiments, additional data comprises voice data. In some embodiments, requesting additional data comprises prompting for a voice data sample to be given (e.g., "Say hello."). In 416, additional data is received. In 418, additional data is analyzed. In various embodiments, analyzing additional data comprises de-noising, dynamic range compressing, filtering, Fourier transforming, extracting vocal parameters, extracting formants, extracting voice hash data, or any other appropriate analysis technique. In 420, additional data is stored in the driver information database. In some embodiments, additional data is stored in the driver information database associated with the ID created in 404. In some embodiments, raw data is stored. In some embodiments, compressed data is stored. In some embodiments, analyzed data is stored.

Figure 5:
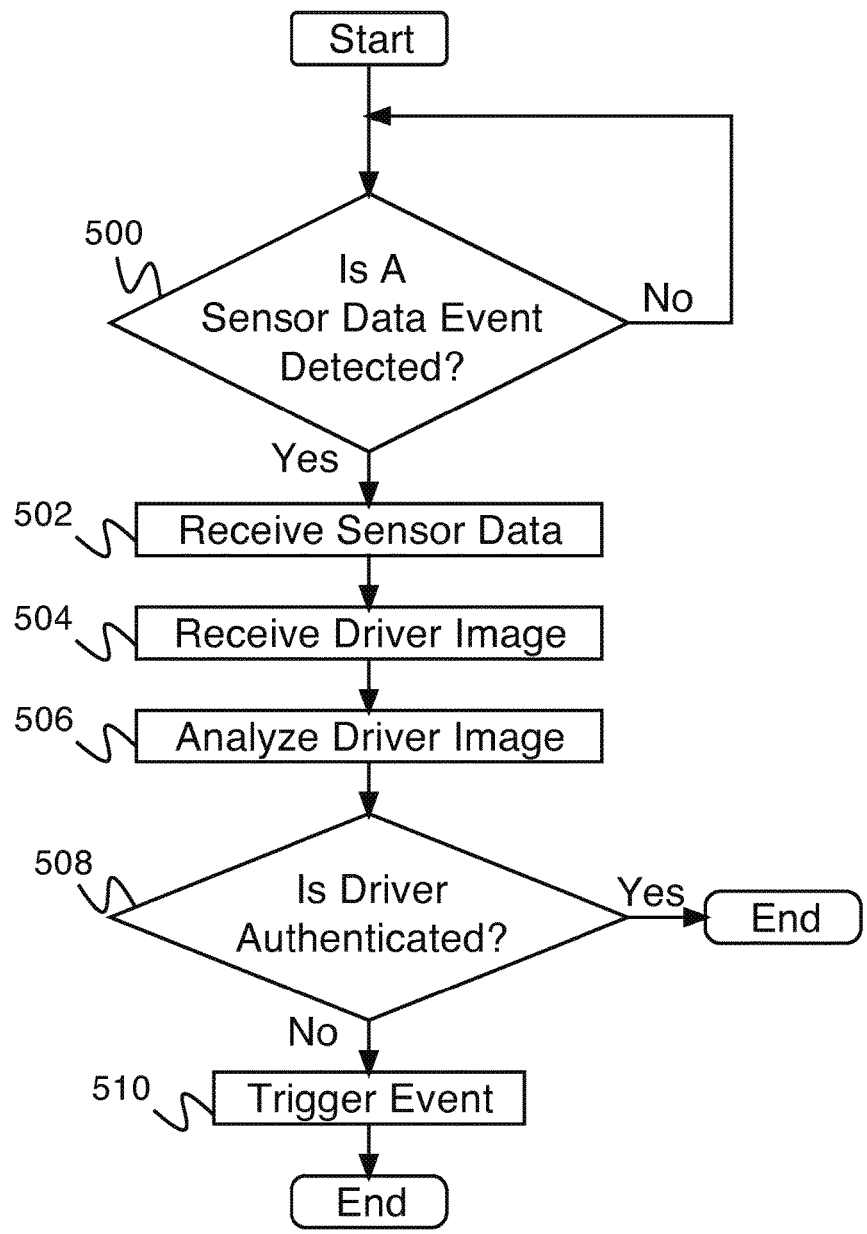
FIG. 5 is a flow diagram illustrating a process for providing real-time alerts or actions.

FIG. 5 is a flow diagram illustrating a process for providing real-time alerts or actions. In some embodiments, the process of FIG. 5 is executed by a vehicle event recorder (e.g., vehicle event recorder 200 of FIG. 2). In the example shown, in 500, it is determined whether a sensor data event is detected. In some embodiments, a sensor data event comprises a sensor registering changing data. In some embodiments, a sensor data event comprises a sensor registering nonzero data. In some embodiments, a sensor data event comprises a driver's seat weight sensor registering a driver sitting. In some embodiments, determining that a sensor data event is detected comprises monitoring the sensor data and determining that the sensor data has changed. In some embodiments, determining that a sensor data event is detected comprises monitoring a sensor data bus and determining that a sensor data event has been received on the sensor data bus. In the event that it is determined that a sensor data event has been detected, control passes to 502. In the event that it is determined that a sensor data event has not been received, the process waits at 500.

In 502, sensor data is received. In some embodiments, sensor data received in 502 comprises sensor data indicated by the sensor data event detected in 500. In 504, a driver image is received. In 506, a driver image is analyzed. In various embodiments, driver image analysis comprises cropping, color-balancing, Fourier transforming, image filtering, image enhancing, determining face data, facial parameter derivation, image hashing, or any other appropriate image analysis technique. In some embodiments, the driver image is analyzed to determine whether a satisfactory image of a driver's face is present in the driver image. In some embodiments, if it is determined that there is not a satisfactory image of a driver's face in the driver image, control passes to 504 and another driver image is received. In some embodiments, if it is determined that the driver's face is hidden (e.g., by sunglasses, a hat, a scarf, etc.) the driver is directed to reveal their face so they can be authenticated. In some embodiments, directing a driver to reveal their face comprises issuing a prerecorded vocal command (e.g., "Please remove your sunglasses."). In some embodiments, after the issuing the prerecorded vocal command, the driver's image is rechecked to see if the driver has removed their glasses. In various embodiments, in the event that the driver does not remove their sunglasses (e.g., after 1, 2, N warnings), one or more of the following: a manager is notified, a report is sent to the backend server indicating a lack of compliance, or any other appropriate action following non-compliance.

In 508, it is determined whether the driver is authenticated. For example, determining whether a driver is authenticated comprises comparing received sensor data and driver image data with stored data (e.g., data stored in the driver information database). The sensor data is compared with stored sensor data values and determined to match any stored data within a predetermined tolerance. In some embodiments, the tolerance is adjustable by a system administrator. Analyzed driver image data is then compared with stored analyzed driver image data for any driver in the driver database found to have matching sensor data. In various embodiments, driver image Fourier transform data is compared, driver face parameters are compared, driver image hash data is compared, or any other appropriate driver image data is compared. In the event that analyzed driver image data is found to match stored driver data, it is determined that the driver is authenticated. In the event that analyzed driver image data is not found to match stored driver data, it is determined that the driver is not authenticated. If it is determined that the driver is authenticated, the process ends. If it is determined that the driver is not authenticated, control passes to 510. In some embodiments, if it is determined that the driver is not authenticated, authentication is redetermined. In some embodiments, authentication is redetermined if only one of the sensor data and the analyzed driver image data match stored data. In some embodiments, authentication is redetermined if one or both of the sensor data or the analyzed image data match stored data within a secondary threshold indicating a near match but not an exact match.

In some embodiments, determining whether the driver is authenticated comprises checking a driver information database (e.g., driver information database 220 of FIG. 2). In some embodiments, determining whether the driver is authenticated comprises comparing face data with stored face data. In some embodiments, determining whether the driver is authenticated comprises comparing a received image with a stored image. In some embodiments, determining whether the driver is authenticated comprises determining that no drivers in a driver information database are associated with the set of face data (e.g., therefore that the driver is not authenticated). In some embodiments, determining whether the driver is authenticated comprises determining that no drivers in a driver information database are associated with the sensor data (e.g., therefore that the driver is not authenticated). In some embodiments, determining whether the driver is authenticated comprises comparing sensor data with received sensor data. In some embodiments, determining whether the driver is authenticated comprises determining that no entry in a driver information database matches both sensor data and face data (e.g., therefore that the driver is not authenticated). In some embodiments, determining whether the driver is authenticated comprises checking a driver schedule.

In some embodiments, determining that the driver is authenticated comprises capturing data (e.g., images, videos, biometric data, other identifying data, etc.), transmitting the data or parameterized data to a server, corresponding the data or parameterized data with a database of drivers (e.g., using a reviewer or a matching algorithm). In some embodiments, a driver identification system captures an image of a driver in an expected location of a vehicle. The image is analyzed to locate a face in the image and extract facial features for processing into a set of face data (e.g., geometric relations between the facial feature—for example, eyes, eye brows, nose, mouth, chin, hair, ears, etc.). The face data are analyzed to identify the driver and associate the driver with captured event data stored or transferred during driving. Face data can be transmitted to a remote server for driver identification. Face data can be used to identify the driver by comparing to face data stored in a database or by employing a model of faces. The face data extracted from a single image of a face is smaller than an image of that face, and so the transmission of face data as opposed to image data is more efficient for the communication between a mobile unit and a remote server.

In 510, an event is triggered. In various embodiments, triggering an event comprises disabling a vehicle (e.g., killing the ignition system, not allowing the engine to receive fuel, etc.), sending an alert to a vehicle data server, sending GPS data to a vehicle data server, activating an alarm, or any other appropriate event triggering.

Figure 6:
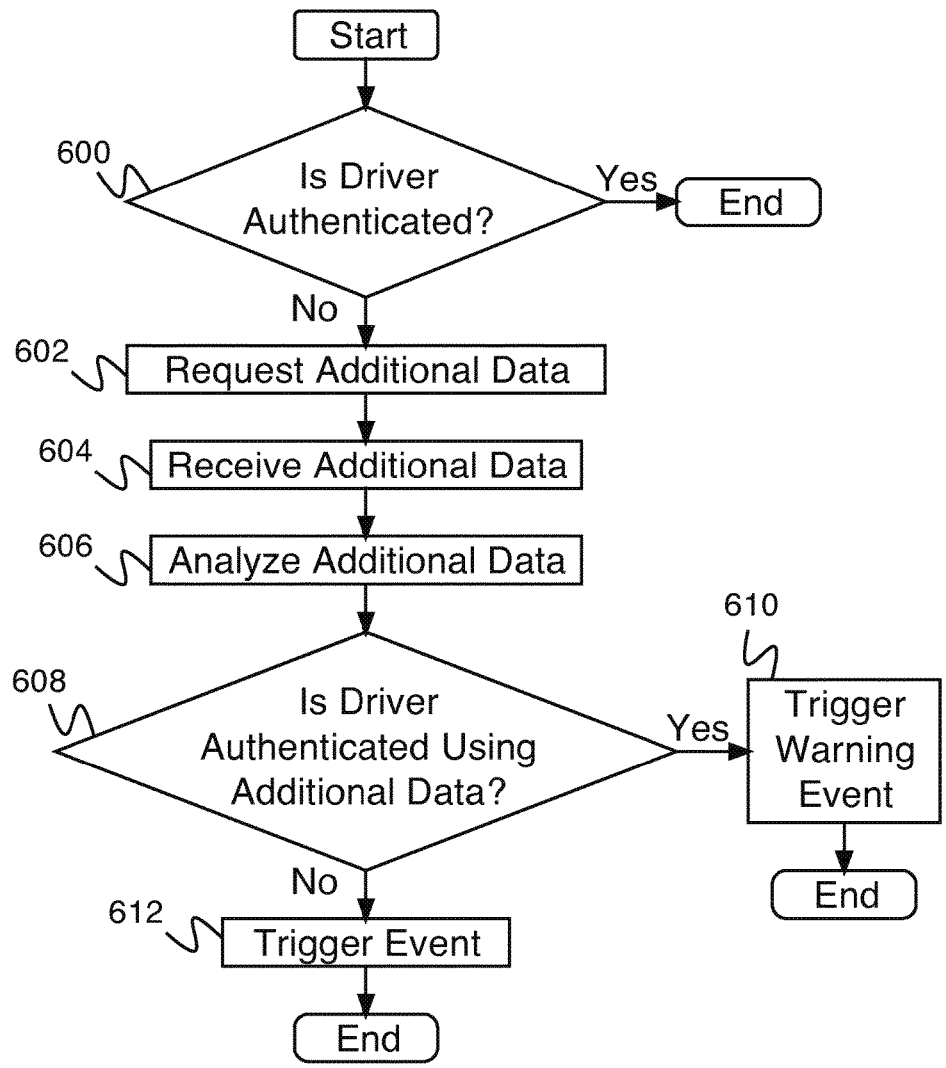
FIG. 6 is a flow diagram illustrating a process for redetermining authentication based on additional received data.

FIG. 6 is a flow diagram illustrating a process for redetermining authentication based on additional received data. In some embodiments, the process of FIG. 6 is executed by a vehicle event recorder (e.g., vehicle event recorder 200 of FIG. 2). In the example shown, in 600, it is determined whether the driver is authenticated. In some embodiments, determining whether the driver is authenticated comprises comparing face data with stored face data. In some embodiments, determining whether the driver is authenticated comprises comparing a received image with a stored image. In some embodiments, determining whether the driver is authenticated comprises comparing sensor data with received sensor data. In some embodiments, determining whether the driver is authenticated comprises determining that no entry in a driver information database matches both sensor data and face data (e.g., therefore that the driver is not authenticated). In some embodiments, determining whether the driver is authenticated comprises determining that one or more entries in a driver information database matches one of sensor data or face data. In some embodiments, determining whether the driver is authenticated comprises determining whether the driver is authenticated 508 of FIG. 5. If it is determined that the driver is authenticated, the process ends. If it is determined that the driver is not authenticated, control passes to 602. In 602, additional data is requested. In some embodiments, additional data comprises voice data. In some embodiments, requesting additional data comprises prompting for a voice data sample to be given (e.g., "Say hello."). In various embodiments, additional data comprises fingerprint data, password data, magnetic stripe data (e.g., from swiping an identification card), radio frequency identification data (e.g., from an identification card with a radio frequency identification tag), or any other appropriate additional data.

In 604, additional data is received. In 606, additional data is analyzed. In various embodiments, analyzing additional data comprises de-noising, dynamic range compressing, filtering, Fourier transforming, extracting vocal parameters, extracting formants, extracting voice hash data, or any other appropriate analysis technique. In 608, it is determined whether the driver is authenticated using additional data. In some embodiments, determining whether the driver is authenticated using additional data comprises determining that voice data matches stored voice data for one of the one or more entries in the driver information database comprising one of matching sensor or voice data. If it is determined that the driver is authenticated using additional data, control passes to 610. In 610, a warning event is triggered. In some embodiments, triggering a warning event comprises sending a warning to a vehicle data server. In some embodiments, a warning comprises an indication that one of driver face data or received sensor data (e.g., driver seat weight data) did not match the recorded data but the driver was allowed to proceed because of an additional data match (e.g., a voice data match). In the event that the driver is not authenticated using additional data, control passes to 612. In 612, an event is triggered. In various embodiments, triggering an event comprises disabling a vehicle, sending an alert to a vehicle data server, sending GPS data to a vehicle data server (e.g., tracking the vehicle), activating an alarm, or any other appropriate event triggering.

Figure 7:
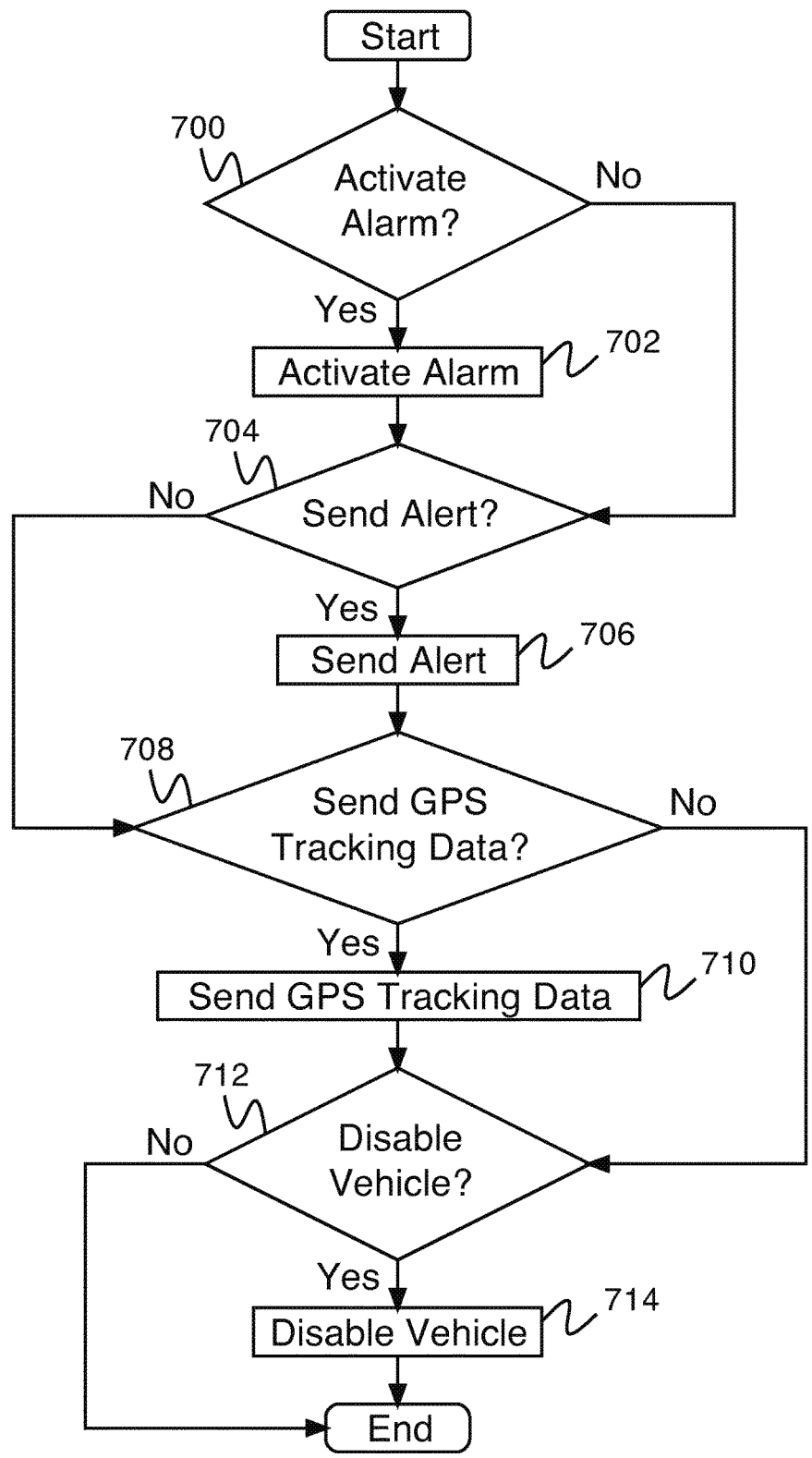
FIG. 7 is a flow diagram illustrating an embodiment of a process for triggering an event.

FIG. 7 is a flow diagram illustrating an embodiment of a process for triggering an event. In some embodiments, the process of FIG. 7 implements 510 of FIG. 5 or 612 of FIG. 6. In the example shown, in 700, it is determined whether to activate an alarm (e.g., an audible alarm, flashing lights, etc.). In some embodiments, a predetermined event trigger setting is stored including information indicating whether to activate an alarm. In some embodiments, determining whether to activate an alarm comprises transmitting an alarm activation query signal and waiting for a response. In the event it is determined to activate the alarm, control passes to 702. In 702, the alarm (e.g., an audible alarm, flashing lights, etc.) is activated. In the event it is determined in 700 to not activate the alarm, control passes to 704.

In 704, it is determined whether to send an alert (e.g., send an alert to the police, to an alarm system company, to the vehicle data server, etc.) In some embodiments, a predetermined event trigger setting is stored including information indicating whether to send the alert. In some embodiments, determining whether to activate an alarm comprises transmitting a send alert query signal and waiting for a response. In the event it is determined to activate the alarm, control passes to 706. In 706, an alert is sent (e.g., to the police, to an alarm system company, to the vehicle data server, etc.) In various embodiments, in the event an alert is received, (e.g., by the vehicle data server), the vehicle is indicated as stolen, the police are notified, private security is sent to check the vehicle, the vehicle is remotely disabled, or any other appropriate action is taken. In the event it is determined in 704 to not send the alert, control passes to 708.

In 708, it is determined whether to send GPS tracking data (e.g., to a vehicle data server, to the police, etc.). In some embodiments, a predetermined event trigger setting is stored including information indicating whether to send GPS tracking data. In some embodiments, determining whether to send GPS tracking data comprises transmitting a send GPS tracking data query signal and waiting for a response. In the event it is determined to send the GPS tracking data, control passes to 710. In 710, GPS tracking data is sent (e.g., to a vehicle data server, to the police, etc.). In various embodiments, in the event GPS tracking data is received (e.g., by the vehicle data server), the GPS tracking data is recorded, is sent to the police, is sent to private security, or any other appropriate action is taken with the GPS tracking data. In the event it is determined in 708 to not send the GPS tracking data, control passes to 712.

In 712, it is determined whether to disable the vehicle. In some embodiments, a predetermined event trigger setting is stored including information indicating whether to disable the vehicle. In some embodiments, determining whether to disable the vehicle comprises transmitting a disable vehicle query signal and waiting for a response. In the event it is determined to disable the vehicle, control passes to 714. In 714, the vehicle is disabled (e.g., rendered unable to drive). In the event it is determined in 712 not to disable the vehicle, the process ends.

In some embodiments, sending a query signal comprises sending a signal from a vehicle stationed device to a server using a wireless connection (e.g., a cellular telephone signal, a WiFi™ signal, etc.). The signal comprises a query requesting information or a decision from a server that monitors signals from the vehicle stationed device. For example, a questions is asked (e.g., activate alarm?, send alert?, disable vehicle?). The question is answered. For example, it is determined that the alarm should be activated so that a server in communication with the vehicle can connect with the robot.

Figure 8:
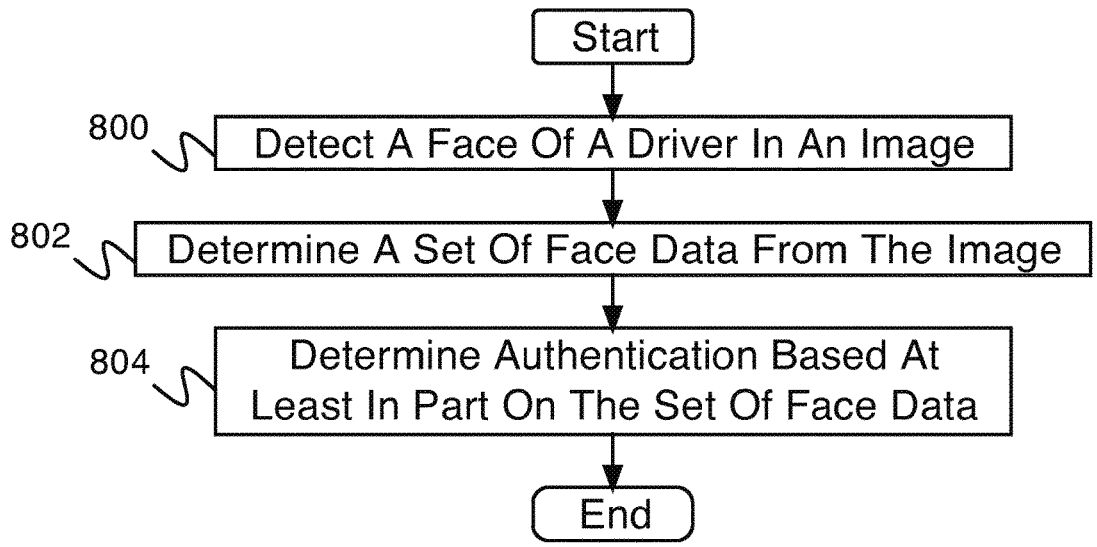
FIG. 8 is a flow diagram illustrating an embodiment of a process for providing real-time alerts or actions.

FIG. 8 is a flow diagram illustrating an embodiment of a process for providing real-time alerts or actions. In some embodiments, the process of FIG. 8 is executed by an event detector (e.g., event detector 218 of FIG. 2). In some embodiments, a system for providing real-time alerts or actions additionally comprises an image capturing device for capturing an image during vehicle operation and of an expected driver location (e.g., camera 210 of FIG. 2). In the example shown, in 800, a face of a driver is detected in an image. In 802, a set of face data is determined from the image. In 804, authentication is determined based at least in part on the set of face data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle event recorder system for providing real-time alerts or actions, comprising:
    an image capturing device for capturing an image during operation of a vehicle and of an expected driver location;
    a processor configured to:
        detect a face of a driver in the image;
        determine an identity of the driver from a driver database based on a set of face data, wherein the set of face data is based on the image;
        determine whether the identity of the driver matches an authorized driver; and
        in the event that the identity of the driver matches the authorized driver, determine that the driver is authenticated as the authorized driver.

2. A system as in claim 1, wherein the processor is further configured to receive sensor data.

3. A system as in claim 2, wherein authentication is based at least in part on the sensor data.

4. A system as in claim 2, wherein the sensor data comprises driver weight.

5. A system as in claim 1, wherein determining authentication comprises determining that no drivers in a driver database are associated with the set of face data.

6. A system as in claim 2, wherein determining authentication comprises determining that no drivers in a driver database are associated with the sensor data.

7. A system as in claim 1, wherein determining authentication comprises checking a driver schedule.

8. A system as in claim 1, wherein the processor is further configured to:
    receive additional data; and
    determine authentication based at least in part on the additional data.

9. A system as in claim 8, wherein additional data comprises voice data.

10. A system as in claim 8, wherein additional data comprises fingerprint data.

11. A system as in claim 8, wherein additional data comprises password data.

12. A system as in claim 1, wherein the processor is further configured to trigger an event.

13. A system as in claim 12, wherein triggering the event comprises disabling a vehicle.

14. A system as in claim 12, wherein triggering the event comprises sending GPS tracking data.

15. A system as in claim 12, wherein triggering the event comprises sending an alert.

16. A system as in claim 12, wherein triggering the event comprises activating an alarm.

17. The system as in claim 1, wherein the image is captured at a particular time and the identity of the driver is determined based on the particular time.

18. The system as in claim 1, wherein the image is captured at a particular time and the identity of the driver is determined based on locating an authorized driver schedule corresponding to the particular time.

19. A method for providing real-time alerts or actions, comprising:
- capturing an image during operation of a vehicle and of an expected driver location;
- detecting, using a processor, a face of a driver in the image;
- determining an identity of the driver from a driver database based on a set of face data, wherein the set of face data is based on the image;
- determining whether the identity of the driver matches an authorized driver; and
- in the event that the identity of the driver matches the authorized driver, determining that the driver is authenticated as the authorized driver.

20. A computer program product for providing real-time alerts or actions, the computer program product being embodied in a non-transitory computer readable storage medium and comprising computer instructions for:
- capturing an image during operation of a vehicle and of an expected driver location;
- detecting, using a processor, a face of a driver in the image;
- determining an identity of the driver from a driver database based on a set of face data, wherein the set of face data is based on the image;
- determining whether the identity of the driver matches an authorized driver; and
- in the event that the identity of the driver matches the authorized driver, determining that the driver is authenticated as the authorized driver.

* * * * *